United States Patent
Huggett et al.

(10) Patent No.: US 8,411,998 B2
(45) Date of Patent: Apr. 2, 2013

(54) METHOD AND APPARATUS PROVIDING PERSPECTIVE CORRECTION AND/OR IMAGE DEWARPING

(75) Inventors: Anthony Huggett, Basingstoke (GB); Graham Kirsch, Tadley (GB)

(73) Assignee: Aptina Imaging Corporation, George Town (KY)

( * ) Notice: Subject to any disclaimer, the term of this patent is extended or adjusted under 35 U.S.C. 154(b) by 1125 days.

(21) Appl. No.: 12/222,950

(22) Filed: Aug. 20, 2008

(65) Prior Publication Data

US 2010/0014770 A1 Jan. 21, 2010

(30) Foreign Application Priority Data

Jul. 17, 2008 (GB) .................................. 0813124.5

(51) Int. Cl.
*G06K 9/32* (2006.01)
(52) U.S. Cl. ......... 382/293; 382/295; 382/296; 382/298
(58) Field of Classification Search .......... 382/275–277, 382/293, 295, 296, 298; 345/427; 348/580, 348/581, 583
See application file for complete search history.

(56) References Cited

U.S. PATENT DOCUMENTS

| | | | | |
|---|---|---|---|---|
| 4,841,292 | A * | 6/1989 | Zeno | 345/419 |
| 5,870,076 | A * | 2/1999 | Lee et al. | 345/694 |
| 5,903,319 | A * | 5/1999 | Busko et al. | 348/607 |
| 6,069,668 | A * | 5/2000 | Woodham et al. | 348/578 |
| 6,236,404 | B1 | 5/2001 | Iimura et al. | |
| 6,346,967 | B1 | 2/2002 | Gullichsen | |
| 6,747,702 | B1 | 6/2004 | Harrigan | |
| 6,885,392 | B1 | 4/2005 | Mancuso et al. | |
| 7,002,603 | B2 | 2/2006 | Tapson | |
| 7,067,808 | B2 * | 6/2006 | Kochi et al. | 250/307 |
| 7,126,616 | B2 | 10/2006 | Jasa et al. | |
| 7,224,392 | B2 | 5/2007 | Cahill et al. | |
| 7,268,803 | B1 | 9/2007 | Murata et al. | |
| 7,333,642 | B2 | 2/2008 | Green | |
| 7,532,760 | B2 * | 5/2009 | Kaplinsky et al. | 382/232 |
| 2002/0180727 | A1 | 12/2002 | Guckenberger et al. | |
| 2002/0191838 | A1 * | 12/2002 | Setterholm | 382/154 |
| 2003/0043303 | A1 | 3/2003 | Karuta et al. | |
| 2004/0156558 | A1 | 8/2004 | Kim | |
| 2005/0058360 | A1 | 3/2005 | Berkey et al. | |
| 2005/0083248 | A1 | 4/2005 | Biocca et al. | |

(Continued)

FOREIGN PATENT DOCUMENTS

| | | |
|---|---|---|
| CA | 2 498 484 | 8/2006 |
| CN | 1996389 A | 7/2007 |

(Continued)

OTHER PUBLICATIONS

Xu et al. ("Method for calibrating cameras with large lens distortion," Optical Engineering 45(4), Apr. 2006, pp. 1-8).*
Li et al. ("Robust distortion correction of endoscope," SPIE vol. 6918, Feb. 2008, pp. 1-8).*

(Continued)

*Primary Examiner* — Yubin Hung

(57) ABSTRACT

Methods and apparatuses for providing dewarping and/or perspective correction of an input image are disclosed. Described embodiments include processing that provides dewarping and/or perspective correction by associating pixel values identified by input pixel addresses corresponding to an input image with output pixel addresses corresponding to an output image. An image processor having a storage circuit and an address mapping unit for determining a corresponding input pixel address from an output pixel address is also disclosed.

27 Claims, 10 Drawing Sheets

U.S. PATENT DOCUMENTS

| | | | |
|---|---|---|---|
| 2005/0174437 A1 | 8/2005 | Iga | |
| 2005/0180655 A1* | 8/2005 | Ohta et al. | 382/275 |
| 2006/0050074 A1 | 3/2006 | Bassi | |
| 2006/0274972 A1 | 12/2006 | Peterson | |
| 2007/0196004 A9 | 8/2007 | Green | |
| 2007/0198586 A1 | 8/2007 | Hardy et al. | |
| 2007/0206877 A1 | 9/2007 | Wu et al. | |
| 2007/0227026 A1 | 10/2007 | Krachtus | |
| 2007/0268530 A1 | 11/2007 | Gagliano et al. | |
| 2007/0273692 A1 | 11/2007 | Woo et al. | |
| 2007/0280554 A1 | 12/2007 | Chernichenko et al. | |
| 2007/0285420 A1 | 12/2007 | Brown | |
| 2008/0074415 A1 | 3/2008 | Woo et al. | |

FOREIGN PATENT DOCUMENTS

| | | |
|---|---|---|
| EP | 1 276 074 A2 | 1/2003 |
| JP | 2000-331151 | 11/2000 |
| JP | 2004-72553 | 3/2004 |
| JP | 2005-18195 | 1/2005 |
| JP | 2005-234776 | 9/2005 |
| JP | 2006-141005 | 6/2006 |
| JP | 2007-28273 | 2/2007 |
| JP | 2007-249967 | 9/2007 |

OTHER PUBLICATIONS

McCall, J. et al., "Video Based Lane Estimation and Tracking for Driver Assistance: Survey, Sytem, and Evaluation", IEEE Transactions on Intelligent Transporation Systems, Dec. 2004, Revised Jul. 2005.

Dasu, A. et al., "A Survey of Media Processing Approaches", IEEE Transactions on Circuits and Systems for Video Technology, vol. 12, Issue 8; pp. 633-645, Aug. 2002.

Li, X., "Vidoe Processing Via Implicit and Mixture Motion Models", IEEE Transactions on Circuits and Systems for Video Technology, vol. 17, Issue 8, pp. 953-963, Aug. 2007.

Kang, S. B. et al., "High Dynamic Range Video", Interactive Visual Media Group, Microsoft Research, Redmond, WA.

Krutz, A. et al., "Improved Image Registration Using the Up-Sampled Domain", Communications Systems Group, TU Berlin, Berlin, Germany, School of IT and EE, Australian Defence Force Academy, Canberra, Australia.

Kunter, M. et al., "Optimal Multiple Sprite Generation Based on Physical Camera Parameter Estimation", Commun. Systems Group, Technische Universitatt berlin, Berlin, Germany, Dept. of Electrical & Computer Engineering, university of Alberta, Edmonton, Canada.

* cited by examiner

Warped Frame of Video Image

Dewarped Frame of Video Image

Perspective-Corrected Frame of Video Image

METHOD AND APPARATUS PROVIDING PERSPECTIVE CORRECTION AND/OR IMAGE DEWARPING

FIELD OF THE INVENTION

The embodiments described herein relate generally to the field of digital image processing, and more specifically to methods and apparatuses providing for dewarping and/or perspective correction of a captured digital image.

BACKGROUND

Microelectronic imaging devices are used in digital cameras, wireless devices with picture capabilities, and many other applications. Cellular telephones, personal digital assistants (PDAs), computers, cameras equipped on automobiles, and stand alone cameras, for example, are incorporating microelectronic imaging devices for capturing and sending pictures. The growth rate of microelectronic imaging devices has been steadily increasing as they become smaller and produce better images having higher pixel counts.

Microelectronic imaging devices include image sensors that use charged coupled device (CCD) systems, complementary metal-oxide semiconductor (CMOS) systems or other imager technology. CCD image sensors have been widely used in digital cameras and other applications. CMOS image sensors are also popular because they have low production costs, high yields, and small sizes.

A camera system uses at least one lens to focus one or more images of a scene to be captured by an imaging device. The imaging device includes a pixel array that comprises a plurality of photosensitive pixels arranged in a predetermined number of columns and rows. Each pixel in the array typically has an individual assigned address. A lens focuses light on the pixels of the pixel array, which then generate signals representing incident light. These signals are then processed to produce an output image.

It is sometimes desirable to alter an image captured by an imaging device. For example, a captured image may be distorted due to the lens used to capture the image. Straight lines in a scene may appear to be curved in the captured image due to the design of the lens used to focus the scene onto the pixel array. This distortion is commonly called "warping," and may be particularly noticeable where certain types of wide angle lenses are used. FIG. 1A illustrates an input image 110. Input image 110 includes lines 116 and a rectangular object 118. Input image 110 has warping (e.g., lines 116, that in reality are straight, appear to be curved).

Warping in a captured image 110 can be corrected through non-linear image processing (known as "dewarping"). FIG. 1B illustrates a corrected (i.e., "dewarped") image 112, in which the lines 116 from the scene which appeared curved in the captured image 110 (FIG. 1A) now appear straight.

It may also be desirable to alter the apparent viewpoint of the camera. For example, image processing (known as "perspective correction") can be used to make it appear as though the camera is capturing the image from a position further away from the viewer and looking at the scene from a more downward angle, reducing the effect of perspective causing lines to appear as though they converge in the distance. For example, the side edges of the rectangular object 118 appear to converge away from the camera in the dewarped image 112 of FIG. 1B.

FIG. 1C illustrates a perspective-corrected and dewarped image 114. Perspective-corrected and dewarped image 114 can be generated by applying further image processing to dewarped image 112 (FIG. 1B). Based on the layout in the perspective-corrected image 114, the camera appears to have been in a different location from the one used to take the warped and dewarped images 110, 112, relative to the rectangular object 118. The side edges of the rectangular object 118 also no longer appear to converge, but rather are parallel.

Dewarping and perspective correction may require significant processing of the input image 110. Further, the processing may require large amounts of hardware to implement. Accordingly, there is a need and desire for a spatially and temporally efficient method for providing dewarping and/or perspective correction of an image.

DETAILED DESCRIPTION OF THE INVENTION

In the following detailed description, reference is made to the accompanying drawings which form a part hereof, and in which are shown by way of illustration specific embodiments that may be practiced. It should be understood that like reference numbers represent like elements throughout the drawings. These example embodiments are described in sufficient detail to enable those skilled in the art to practice them. It is to be understood that other embodiments may be utilized, and that structural and electrical changes may be made, only some of which are discussed in detail below.

Figure 1A:
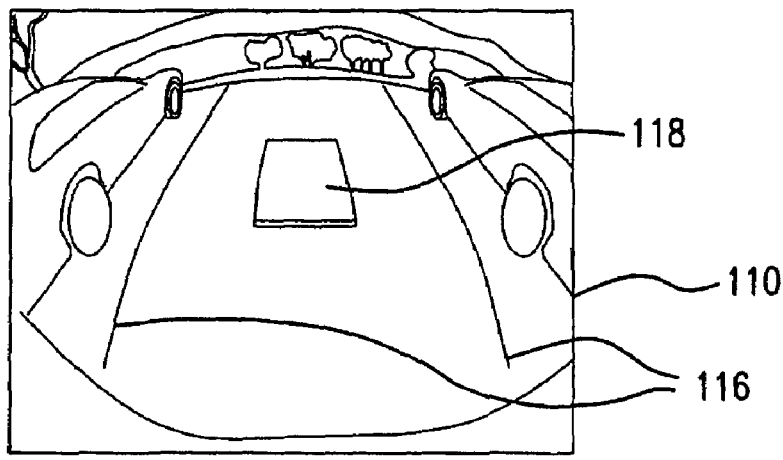
FIG. 1A illustrates a captured image.
Figure 1B:
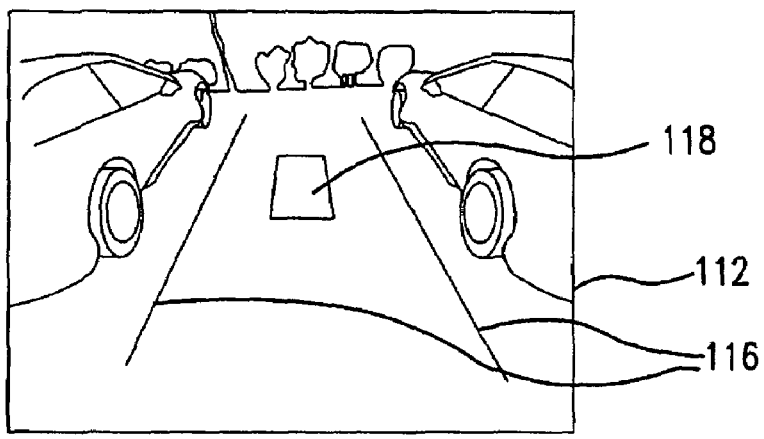
FIG. 1B illustrates a dewarped image generated from the captured image of FIG. 1A.
Figure 1C:
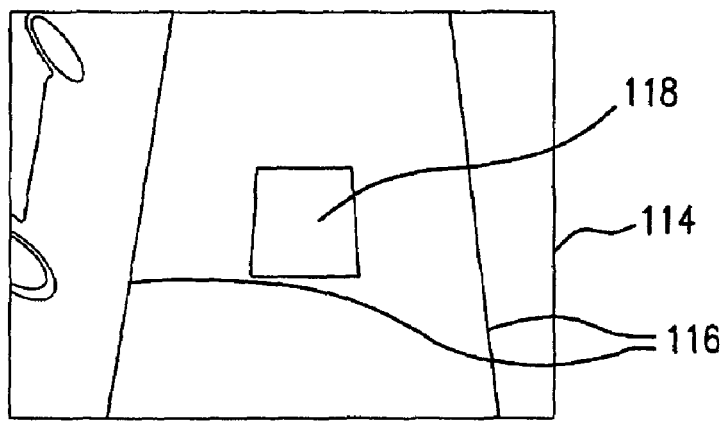
FIG. 1C illustrates a perspective-corrected image generated from the dewarped image of FIG. 1B.

Embodiments described herein perform the dewarping and/or perspective correction shown in FIGS. 1A through 1C by rearranging portions of captured image 110 according to processing described herein. Pixel values of captured image 110, or functions thereof, are mapped onto corresponding locations of dewarped and perspective-corrected image 114. This mapping of a value for a desired output pixel location from one or more input pixel locations, while accounting for desired dewarping and/or perspective correction, is implemented using a single level of processing, described herein. Furthermore, space-efficient implementations of imager and image processing components are disclosed. These efficiencies can help achieve smaller camera systems. In imaging devices that have the image processing circuitry for processing the captured image implemented on the same microchip as the imager (i.e., "system-on-chip"), the size of the image processing circuitry is of paramount concern.

Figure 2:
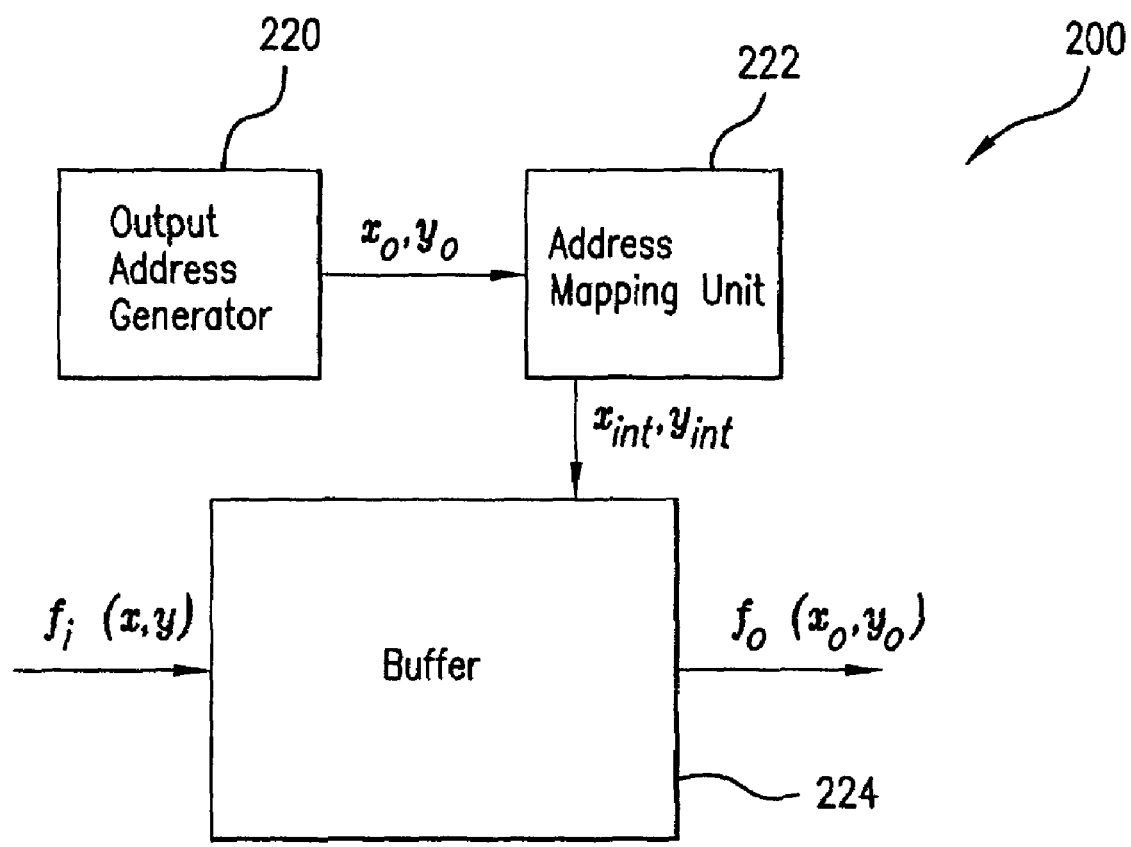
FIG. 2 is a block diagram of an image processor with address mapping, in accordance with a first embodiment of the present invention.

FIG. 2 illustrates a block diagram of a first embodiment of an image processor 200 for implementing dewarping and/or perspective correction. Image processor 200 includes a buffer 224, an output address generator 220, and an address mapping unit 222. Image processor 200 receives a plurality of lines of pixel values $f_i(x, y)$ from an input image that may have warping and is captured from a first perspective (e.g., captured image 110 of FIG. 1A), and outputs individual output pixel values $f_o(x_o, y_o)$ of an output image that is dewarped and/or perspective-corrected (e.g., dewarped and perspective-corrected image 114 of FIG. 1C). The buffer 224 acts as a storage circuit for the plurality of lines of pixel values $f_i(x, y)$, and outputs pixel values according to the address mapping unit 222.

In image processor 200, an output pixel value $f_o(x_o, y_o)$ for an output pixel address $(x_o, y_o)$ in the output image is determined from a stored input pixel value $f_i(x_{int}, y_{int})$ from the input image. For each output pixel address $(x_o, y_o)$ in the output image, address mapping unit 222 calculates horizontal and vertical input indexes $x_i$, $y_i$ indicating a corresponding input pixel address $(x_{int}, y_{int})$ associated with an input pixel value $f_i(x_{int}, y_{int})$ stored in buffer 220 to be placed at the output pixel address $(x_o, y_o)$. When calculating the horizontal and vertical input indexes $x_i$, $y_i$, address mapping unit 222 uses received parameters, discussed below, to determine the amount of radial gain (i.e., horizontal and vertical scaling) applied to the output pixel address $(x_o, y_o)$ in order to account for warping in the input image, and the amount of horizontal gain (i.e., horizontal scaling) and vertical offset (i.e., vertical shifting) to be applied to the output pixel address $(x_o, y_o)$ in order to account for variation between the desired perspective in the output image and the original perspective in the captured image.

Figure 10:
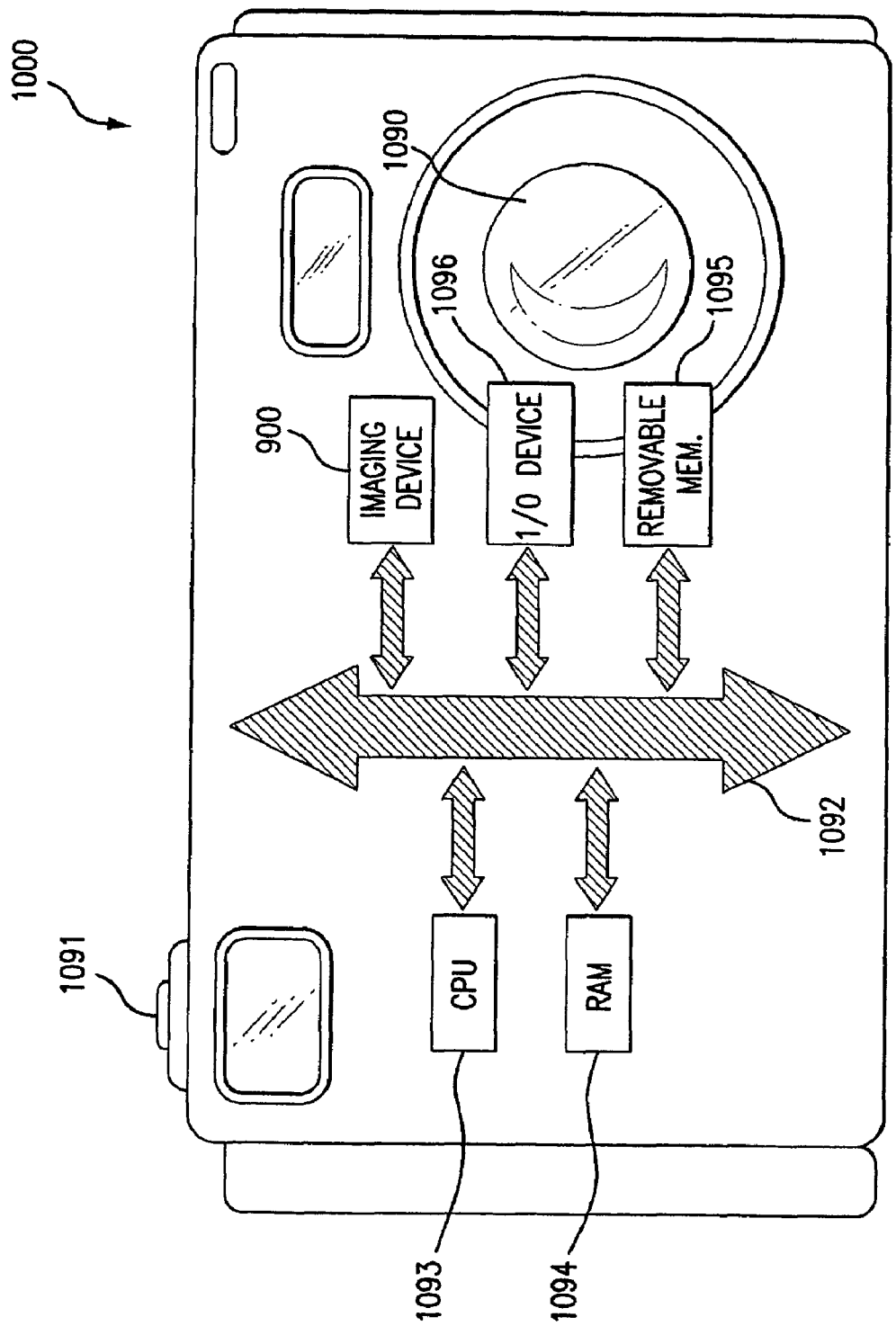
FIG. 10 is a system implementing an image processor in accordance with an embodiment described herein.

In image processor 200, address mapping unit 222 calculates and outputs horizontal and vertical indexes $x_i$, $y_i$ as integer values $x_{int}$, $y_{int}$. The indexes $x_{int}$, $y_{int}$ are transmitted to the buffer 224, which outputs the corresponding input pixel value $f_i(x_{int}, y_{int})$ as output pixel value $f_o(x_o, y_o)$ to a storage device, e.g., a random access memory 1094 (FIG. 10).

It should be understood that pixel values of an image are organized as a grid of (M×N) coordinates. Each input pixel value $f_i(x, y)$ and output pixel value $f_o(x, y)$ is assigned a corresponding pixel address of Cartesian coordinates $(x_M, y_N)$ measured from the top left corner of the grid. It should be understood that, for addressing purposes, the horizontal and vertical indexes x, y of the input pixel address are integer values. Thus, in image processor 200, the horizontal and vertical input indexes $x_i$, $y_i$ calculated by the address mapping unit 222 (as described below) are integer values $x_{int}$, $y_{int}$. As described in later embodiments (e.g., image processor 300 of FIG. 3), however, it may be desirable to calculate the horizontal and vertical input indexes $x_i$, $y_i$ as scaled floating point values with integer components $x_{int}$, $y_{int}$ and fractional components $x_{fraction}$, $y_{fraction}$.

It should also be understood that the input and output images may have differing numbers of pixels (i.e., different values of M and N), and thus different center addresses. The potential difference between center pixel addresses of the input image 110 and the output image 114 can be accounted for by performing image processing on the offset of the respective horizontal and vertical indexes (i.e., calculating how far the corresponding horizontal and vertical input indexes $x_i$, $y_i$ are from the center of the captured image 110), as described further below.

The corresponding input pixel address $(x_{int}, y_{int})$ represents a portion of the captured image which, after dewarping and perspective correction, properly belongs at the output pixel address $(x_o, y_o)$. For example, referring back to FIGS. 1A and 1C, to generate perspective-corrected and dewarped image 114, each pixel address of the output image had a corresponding input pixel address in the captured image 110, the corresponding input pixel address being determined by address mapping unit 220. In perspective-corrected and dewarped image 114, the pixel addresses of the pixels showing the lines 116 (now straight) would be approximately vertical, yet their pixel value would be determined from a corresponding pixel address constituting the curved edges of lines 116 in captured image 110.

Figure 3:
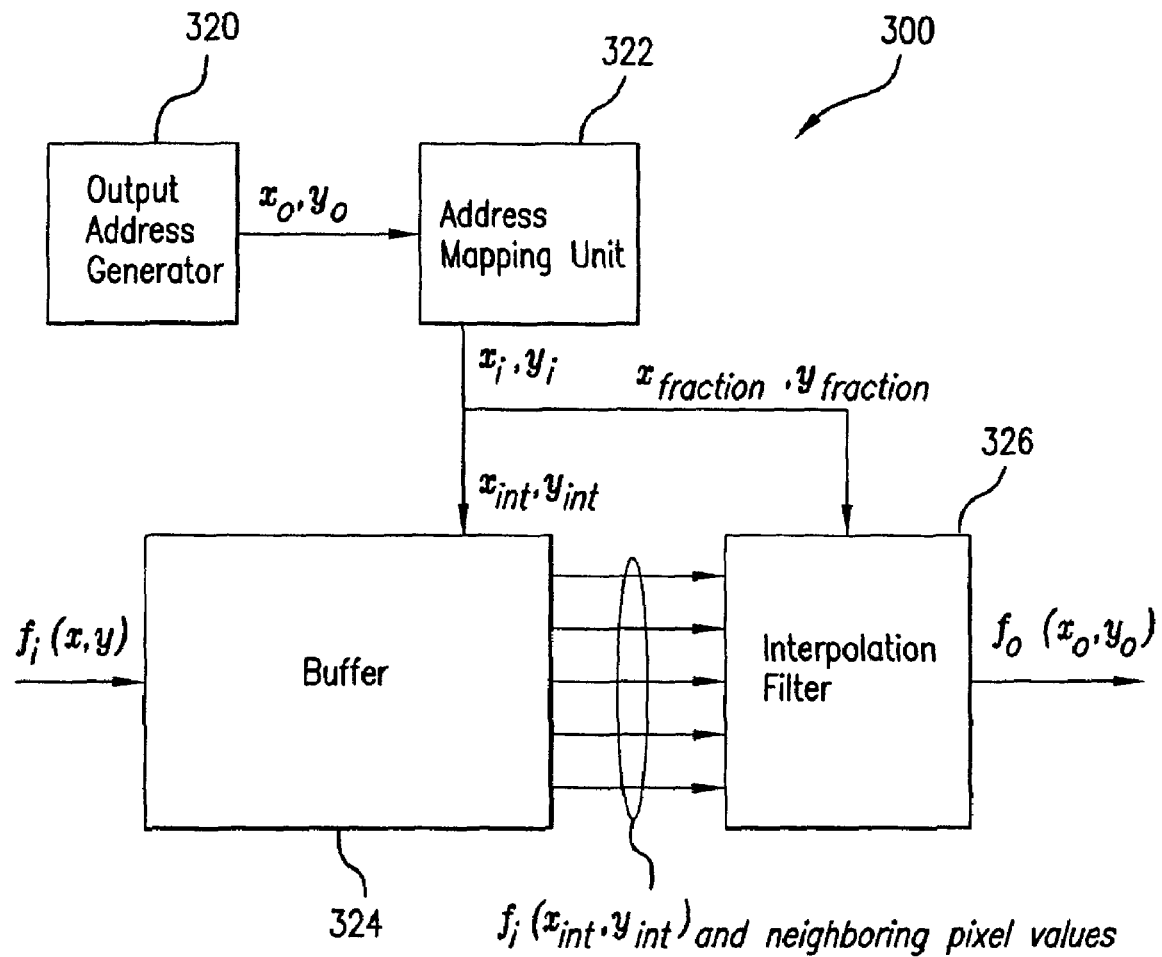
FIG. 3 is a block diagram of an image processor with address mapping and an interpolation filter, in accordance with a second embodiment of the present invention.

FIG. 3 illustrates a block diagram of a second embodiment of an image processor 300, in accordance with an embodiment for implementing dewarping and perspective correction as described herein. Image processor 300 also includes a buffer 324, an output address generator 320, and an address mapping unit 322.

Image processor 300 further includes an interpolation filter 326. The interpolation filter 326 and buffer 320 act as a storage circuit for the plurality of lines of pixel values $f_i(x, y)$, and output pixel values according to the address mapping unit 322. As with the address mapping unit 222 of image processor 200 (FIG. 2), for each output pixel address $(x_o, y_o)$ in the output image, address mapping unit 322 calculates horizontal and vertical input indexes $x_i$, $y_i$ indicating a corresponding input pixel address $(x_{int}, y_{int})$ associated with an input pixel value $f_i(x_{int}, y_{int})$ stored in buffer 320 to be placed at the output pixel address $(x_o, y_o)$. Also like address mapping unit 222 of image processor 200 (FIG. 2), when calculating the horizontal and vertical input indexes $x_i$, $y_i$, address mapping unit 322 uses received parameters, discussed below, to determine the amount of radial gain (i.e., horizontal and vertical scaling) applied to the output pixel address $(x_o, y_o)$ in order to account for warping in the input image, and the amount of horizontal gain (i.e., horizontal scaling) and vertical offset (i.e., vertical shifting) to be applied to the output pixel address $(x_o, y_o)$ in order to account for variation between the desired perspective in the output image and the original perspective in the captured image.

In the illustrated embodiment of image processor 300, the horizontal and vertical indexes $x_i$, $y_i$ are calculated by address mapping unit 322 as scaled floating point numbers with integer components $x_{int}$, $y_{int}$ and fractional components $x_{fraction}$, $y_{fraction}$. The integer components $x_{int}$, $y_{int}$ are transmitted from address mapping unit 322 to buffer 324, which outputs the corresponding input pixel value $f_i(x_{int}, y_{int})$. In addition to outputting the corresponding input pixel value $f_i(x_{int}, y_{int})$, buffer 324 also outputs to interpolation filter 326 pixel values corresponding to a plurality of neighboring input pixel addresses.

The fractional components $x_{fraction}$, $y_{fraction}$ are output from address mapping unit 322 to interpolation filter 326. Interpolation filter 326 calculates an output pixel value $f_o(x_o, y_o)$ corresponding to the output pixel address $(x_o, y_o)$ as a function of the determined input pixel value $f_i(x_{int}, y_{int})$ and the neighboring pixel values, according to the fractional components $x_{fraction}$, $y_{fraction}$. For instance, interpolation filter 326 may interpolate the pixel values output by buffer 324, giving weight to each pixel value according to the fractional components $x_{fraction}$, $y_{fraction}$. The interpolation filter 326 outputs the calculated output pixel value $f_o(x_o, y_o)$ to a storage device, e.g., random access memory 1094 (FIG. 10).

In image processor 300, the integer components $x_{int}$, $y_{int}$ and fractional components $x_{fraction}$, $y_{fraction}$ of the horizontal and vertical indexes $x_i$, $y_i$ calculated by address mapping unit 322 may be separated at the output of address mapping unit 322, according to any known methods (e.g., integer and component filters). Alternatively, the entire scaled floating point values of horizontal and vertical indexes $x_i$, $y_i$ may be output by address mapping unit 322 to both buffer 324 and interpolation filter 326, and the inputs of buffer 324 and interpolation filter 326 may each filter the received horizontal and vertical indexes $x_i$, $y_i$ to receive the appropriate components.

In another embodiment of image processor 300, address mapping unit 322 may instead calculate the horizontal and vertical indexes $x_i$, $y_i$ as integer values ($x_{int}$, $y_{int}$), and calculate the output pixel value $f_o(x_o, y_o)$ according to pre-determined processes. In this alternative embodiment, address mapping unit 322 communicates the horizontal and vertical indexes $x_i$, $y_i$ to buffer 324. Buffer 324 outputs the corresponding input pixel value $f_i(x_{int}, y_{int})$ and the input pixel values corresponding to a plurality of neighboring input pixel addresses to interpolation filter 326. Because the horizontal and vertical indexes $x_i$, $y_i$ are calculated as integer values $x_{int}$, $y_{int}$, rather than receiving and using fractional components $x_{fraction}$, $y_{fraction}$, interpolation filter 326 calculates an output pixel value $f_o(x_o, y_o)$ according to pre-determined processes, such as averaging of the pixel values output by buffer 324, and outputs $f_o(x_o, y_o)$ to a storage device, e.g., random access memory 1094 (FIG. 10).

Figure 4:
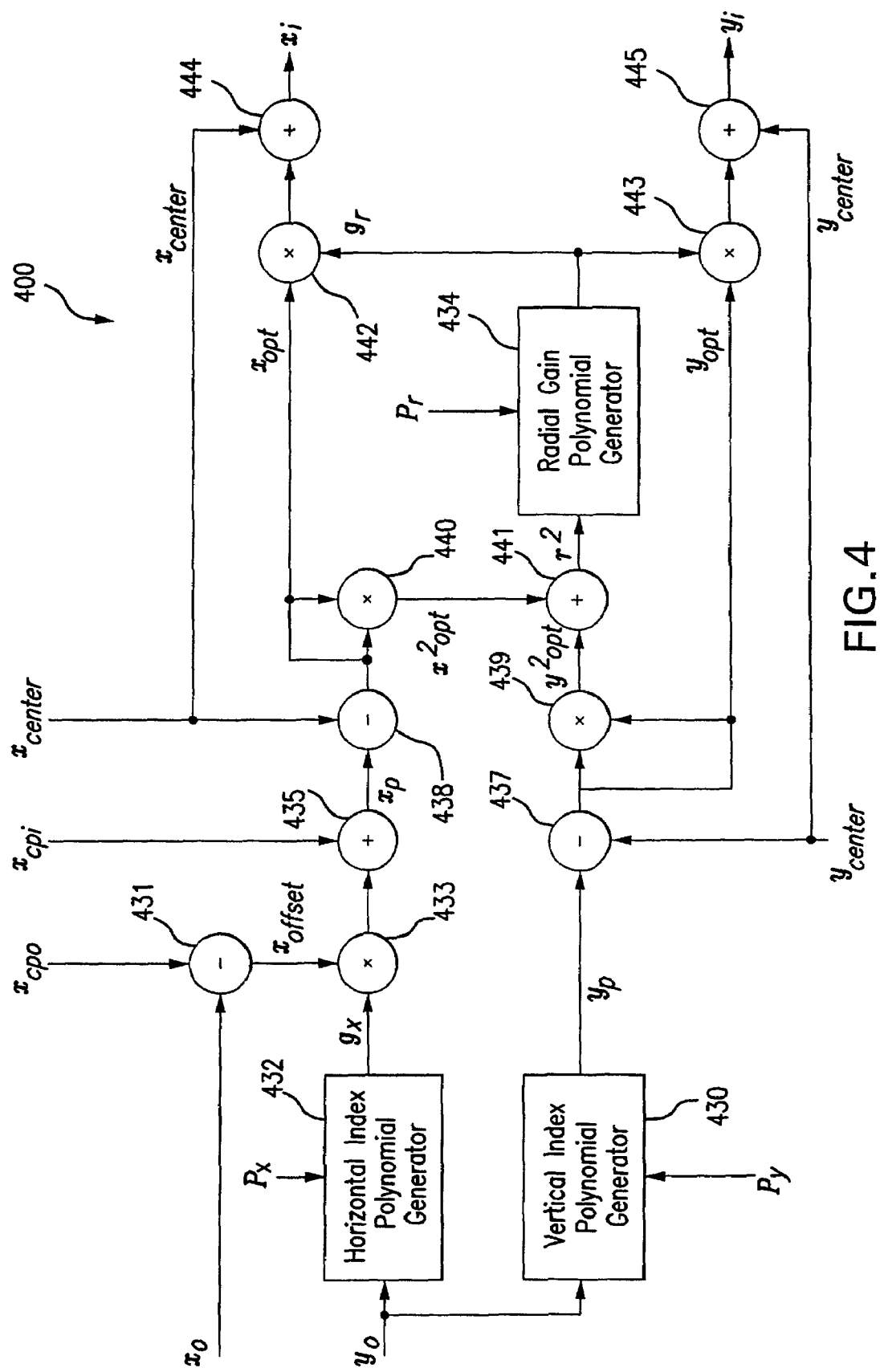
FIG. 4 is a functional diagram of a first embodiment of an address mapping function.

FIG. 4 shows a functional diagram of a first embodiment of an address mapping unit 400 that can be used in the image processor 300 described above. Address mapping unit 400 determines the horizontal and vertical indexes $x_i$, $y_i$ corresponding to an input pixel address ($x_{int}$, $y_{int}$) of the input image $f_i(x, y)$ stored in the buffer 324 (FIG. 3). The pixel value stored at the input pixel address ($x_{int}$, $y_{int}$) is used to determine the pixel value corresponding to the desired output pixel address ($x_o$, $y_o$), allowing for dewarping and perspective correction of the input image. To preserve horizontal straight lines in the dewarped image, the address mapping unit 400 implements perspective correction with linear scaling horizontally about the center of the image, and shifting vertically.

Address mapping unit 400 calculates corresponding input address indexes $x_i$, $y_i$ as described below. In the described embodiment, the input address indexes $x_i$, $y_i$ are calculated as scaled floating point values having integer components $x_{int}$, $y_{int}$ and fractional components $x_{fraction}$, $y_{fraction}$, such as for use in image processor 300 (FIG. 3). In another embodiment, however, the input address indexes $x_i$, $y_i$ may be calculated as integer values, such as for use with image processor 200 (FIG. 2), or with other embodiments of an image processor with an address mapping unit which does not use fractional components $x_{fraction}$, $y_{fraction}$. For example, the horizontal index polynomial function generator 430, vertical index polynomial function generator 432, and radial gain polynomial function generator 434 may be configured such that their respective outputs are integer values.

Address mapping unit 400 receives the horizontal and vertical output indexes $x_o$, $y_o$ from the output address generator 320 (FIG. 3). Address mapping unit 400 also receives three sets of polynomial function coefficients: horizontal index polynomial coefficients $P_x$; vertical index polynomial coefficients $P_y$; and radial gain polynomial coefficients $P_r$. Horizontal index polynomial coefficients $P_x$ are used by address mapping unit 400 to calculate the horizontal gain $g_x$, in order to account for the horizontal scaling of perspective correction. Vertical index polynomial coefficients $P_y$ are used by address mapping unit 400 to calculate the vertical offset $y_P$, in order to account for the vertical shifting of perspective correction. Radial gain polynomial coefficients $P_r$ are used by address mapping unit 400 to calculate the radial gain $g_r$, in order to account for the horizontal and vertical scaling of dewarping.

The sets of polynomial function coefficients $P_x$, $P_y$, $P_r$ may be input from an external program or a user, or may be pre-programmed in address mapping unit 400 as based on known dewarping and perspective correction values for a particular imaging system, or for a desired result. For example, it may be desirable to input horizontal and vertical index polynomial coefficients $P_x$, $P_y$, calculated through known processes, based upon the desired perspective. It may also be desirable to store radial gain polynomial coefficients $P_r$ in the address mapping unit 400 if address mapping unit 400 is configured for receiving an input image from a camera system (e.g., system 1000 of FIG. 10) having a lens 1090 having a known amount of image warping.

Figure 5:
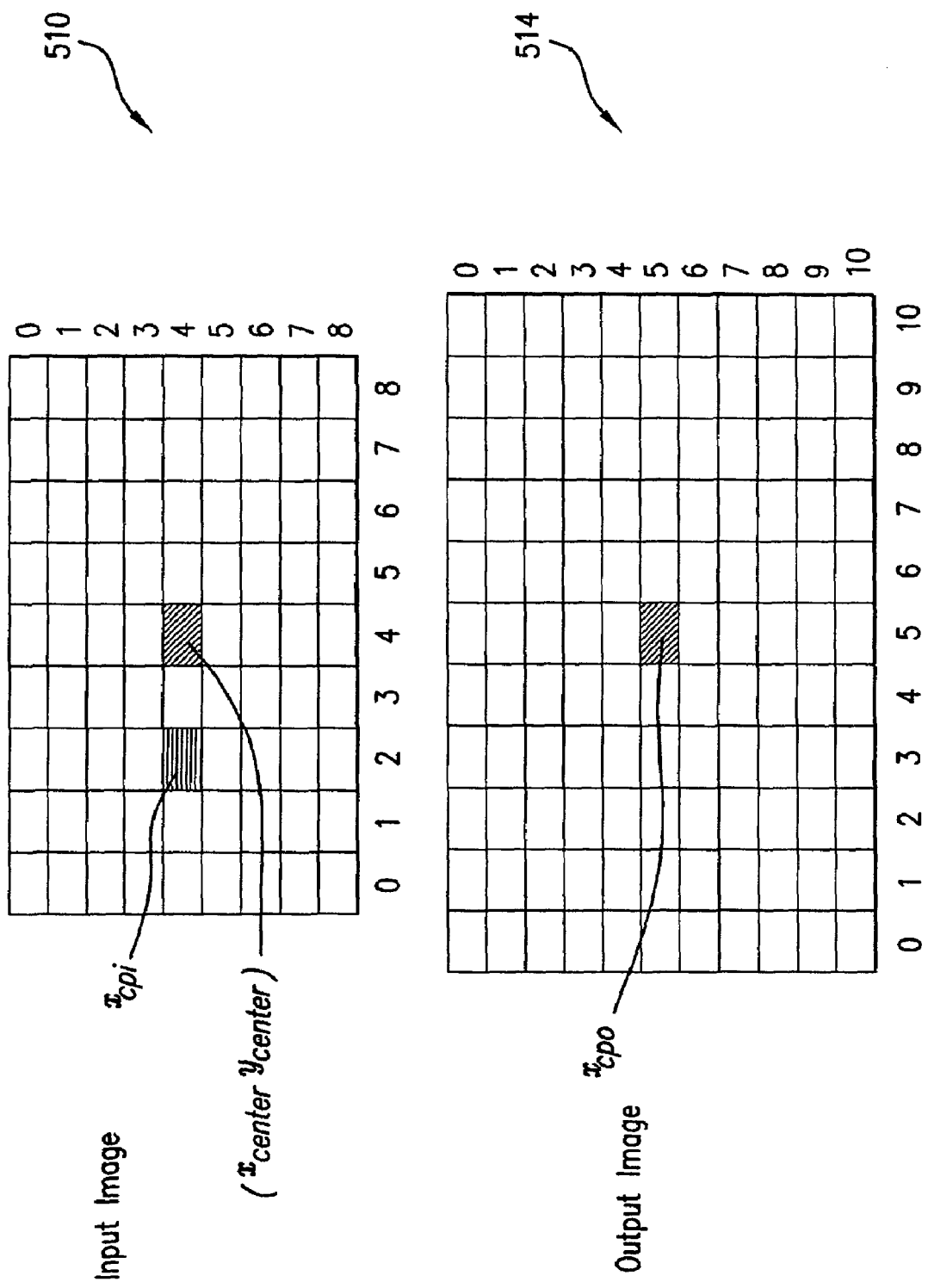
FIG. 5 is a diagram showing examples of pixel locations of an input and output image.

Address mapping unit 400 also receives an output horizontal perspective center index $x_{cpo}$ which represents the horizontal center of the output image, and an optical horizontal perspective center index $x_{cpi}$ which represents the location of the horizontal center for the desired perspective of the input image. These values also may be input from an external program or a user, or may be pre-programmed in address mapping unit 400. Address mapping unit 400 also receives horizontal and vertical optical center indexes $x_{center}$, $y_{center}$, respectively, which represent the center pixel address of the input image. FIG. 5 illustrates these indexes in association with pixels in an input image 510 and output image 514.

It should be understood that embodiments of address mapping units described herein, such as address mapping units 400 (FIG. 4), 600 (FIG. 6), and 700 (FIG. 7), implement both dewarping and perspective correction, the described address mapping units may only perform one or the other process. For example, if horizontal index polynomial coefficients $P_x$ are chosen such that the horizontal gain $g_x=1$, and vertical index polynomial coefficients $P_y$ are chosen such that $y_p=y_o$, and $x_{cpi}=x_{center}$, no perspective correction will be applied to the input image. Similarly, if radial gain polynomial coefficients $P_r$ are chosen such that the radial gain $g_r=1$, no dewarping will be applied to the input image.

In the illustrated embodiment shown in FIG. 4, address mapping unit 400 first computes perspective-corrected horizontal and vertical indexes $x_p$, $y_p$, respectively. The perspective-corrected indexes $x_p$, $y_p$ represent the address ($x_p$, $y_p$) of the input pixel value corresponding to the desired output pixel address ($x_o$, $y_o$) after the input image is linearly scaled and shifted to implement perspective correction.

The perspective-corrected vertical index $y_p$ may be calculated by address mapping unit 400 as described below. The vertical output index $y_o$ is input into a vertical index polynomial function generator 430. The vertical index polynomial function generator 430 also receives the set of vertical index polynomial coefficients $P_y$. The result of the vertical index polynomial function generator 430, perspective-corrected vertical index $y_p$, accounts for vertical shifting to be implemented during perspective correction.

The perspective-corrected horizontal index $x_p$ may be calculated by address mapping unit 400 as described below. The vertical output index $y_o$ is input into a horizontal index polynomial function generator 432. The horizontal index polynomial function generator 432 also receives the set of horizontal index polynomial coefficients $P_x$. The horizontal index polynomial function generator 432 calculates and outputs a perspective-corrected horizontal gain $g_x$. The perspective-corrected horizontal gain $g_x$ represents the amount of gain (i.e., horizontal scaling) to be applied to the horizontal offset $x_{offset}$ according to the vertical output index $y_o$, in order to implement the desired perspective correction.

The horizontal output index $x_o$ is input into a first subtraction circuit 431 along with the output horizontal perspective center index $x_{cpo}$, the result of which is the horizontal offset $x_{offset}$. The horizontal offset $x_{offset}$ is entered into a first product circuit 433 along with the perspective-corrected horizontal gain $g_x$. The output product $x_{offset} \times g_x$ is entered into a first summing circuit 435 along with the input horizontal perspective center index $x_{cpi}$, thus adjusting the corrected horizontal offset $x_{offset} \times g_x$ to be relative to pixel addresses in the input image, and centered at the desired new perspective center. The output of the first summing circuit 435, $x_{cpi}+(x_{offset} \times g_x)$, gives the value of the perspective-corrected horizontal index $x_p$.

In the illustrated embodiment, the vertical output index $y_o$ remains constant for a line $(x_{0 \to M}, y_N)$ of output pixel values. Therefore, the perspective-corrected vertical index $y_p$ and the perspective-corrected horizontal gain $g_x$ also remain constant for a line $(x_{0 \to M}, y_N)$ of output pixel values.

In the illustrated embodiment, the address mapping unit 400 also accounts for dewarping of the pixel image when calculating horizontal and vertical input indexes corresponding to the horizontal and vertical output indexes $x_o$, $y_o$ of the desired output pixel address $(x_o, y_o)$. Horizontal and vertical input indexes $x_i$, $y_i$ can be determined from the perspective-corrected horizontal and vertical indexes $x_p$, $y_p$ as described below.

The horizontal and vertical optical center indexes $x_{center}$, $y_{center}$, which represent the center pixel address $(x_{center}, y_{center})$ of the input pixel image $f_i(x, y)$, respectively, are entered into second and third subtraction circuits 437, 438 along with the perspective-corrected horizontal and vertical indexes $x_p$, $y_p$, respectively. The results of the second and third subtraction circuits 437, 438 are the horizontal and vertical optical offsets $x_{opt}$, $y_{opt}$. The horizontal and vertical optical offsets $x_{opt}$, $y_{opt}$ are each squared in second and third product circuits 439, 440, respectively, and both squared optical offsets $x_{opt}^2$, $y_{opt}^2$ are entered into a second summing circuit 441. The result of second summing circuit 441 is squared radius $r^2$, which represents the radial distance of the perspective-corrected pixel address $(x_p, y_p)$ from the center pixel address $(x_{center}, y_{center})$ of the input image $f_i(x, y)$.

The squared radius $r^2$ is input into a radial gain polynomial function generator 434. Radial gain polynomial function generator 434 also receives the set of radial gain polynomial coefficients $P_r$. Radial gain polynomial coefficients $P_r$ may be programmed based on the degree of warping of the input image $f_i(x, y)$. The radial gain polynomial function generator 434 outputs the radial gain $g_r$.

The horizontal and vertical optical offsets $x_{opt}$, $y_{opt}$ are each multiplied by the radial gain $g_r$ at fourth and fifth product circuits 442, 443. At third and fourth summing circuits 444, 445, the horizontal and vertical optical center indexes $x_{center}$, $y_{center}$ are added back to the respective dewarped horizontal and vertical optical offsets $x_{opt} \times g_r$, $y_{opt} \times g_r$, thus centering the dewarped horizontal and vertical offset optical offsets $x_{opt} \times g_r$, $y_{opt} \times g_r$ relative to the center pixel address $(x_{center}, y_{center})$ of the input image $f_i(x, y)$. The resulting sums $(x_{opt} \times g_r)+x_{center}$, $(y_{opt} \times g_r)+y_{center}$ represent the respective horizontal and vertical input indexes $x_i$, $y_i$ indicating the address of the input pixel value $f_i(x_{int}, y_{int})$ that will be used to determine the output pixel value $f_o(x_o, y_o)$ at the desired output pixel address $(x_o, y_o)$.

Figure 6:
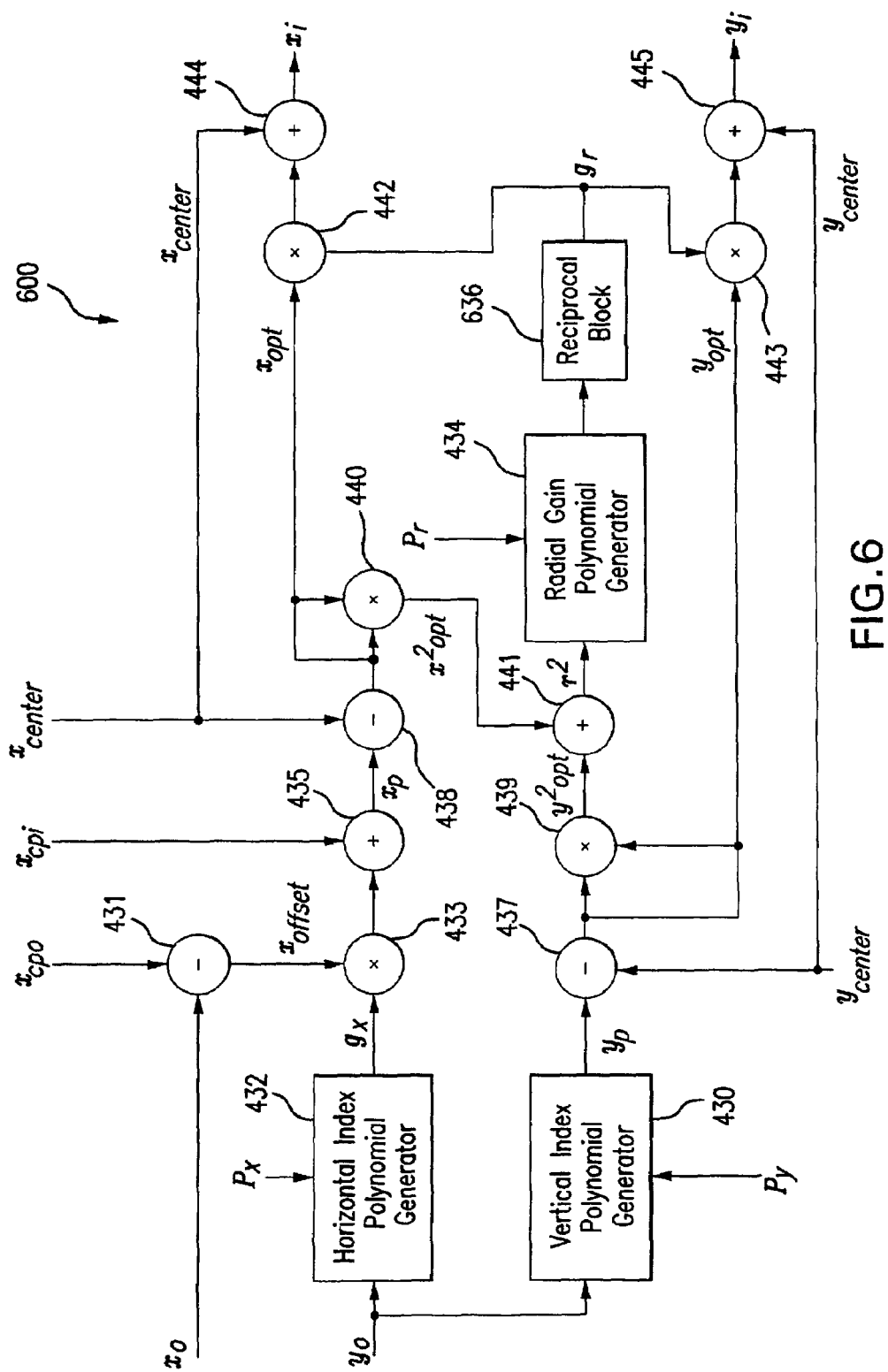
FIG. 6 is a functional diagram of a second embodiment of an address mapping function.

FIG. 6 shows a functional diagram of a second embodiment of an address mapping unit 600 that can be used in processors 200, 300 described above. Address mapping unit 600 is similar to address mapping unit 400 (FIG. 4), and like numerals and functions indicate like elements. In address mapping unit 600, however, the output of the radial gain polynomial function generator 434 is used by a reciprocal function block 636. The reciprocal of the output of the radial gain polynomial function generator 434 is used as the radial gain $g_r$. By taking the output of the reciprocal function block 636 as the radial gain $g_r$, address mapping unit 600 may provide better dewarping when a low-order polynomial function generator is used for the radial gain polynomial function generator 434.

As with address mapping unit 400 (FIG. 4), the illustrated embodiment of address mapping unit 600 calculates corresponding input address indexes $x_i$, $y_i$ as scaled floating point values, such as for use by the interpolation filter 326 of image processor 300 (FIG. 3). In another embodiment, however, the input address indexes $x_i$, $y_i$ may be calculated as integer values (i.e., the horizontal index polynomial function generator 430, vertical index polynomial function generator 432, and radial gain polynomial function generator 434 are configured such that their respective outputs are integer values), such as for use with image processor 200 (FIG. 2), or with other embodiments of an image processor with an address mapping unit which does not use fractional components $x_{fraction}$, $y_{fraction}$.

Figure 7:
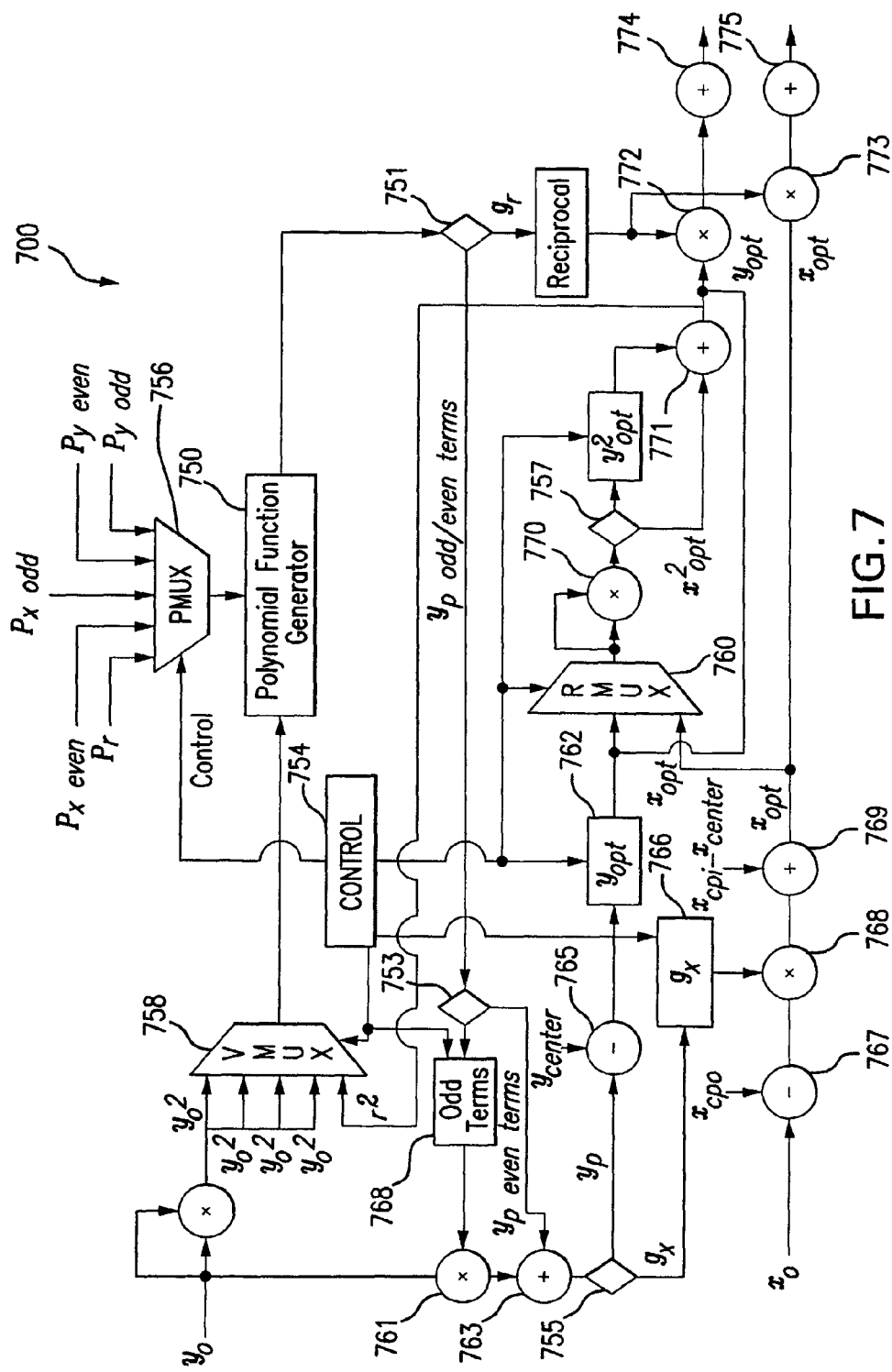
FIG. 7 is a functional diagram of a third embodiment of an address mapping function.

FIG. 7 is a functional diagram of a third embodiment of an address mapping unit 700. Address mapping unit 700 uses multiplexers to reduce the number of polynomial function generators used in the computation, thus reducing the size of address mapping unit 700. Because the polynomial functions calculated for perspective correction (i.e., the vertical optical offset $y_{opt}$ and the perspective-corrected horizontal gain $g_x$) are calculated using the vertical output index $y_o$ but not the horizontal output index $x_o$, these polynomial functions remain constant for a line of output pixel values $(x_{0 \to M}, y_N)$, and need only be calculated once per line of output pixel values. Accordingly, the vertical optical offset $y_{opt}$ and the perspective-corrected horizontal gain $g_x$ may be determined by polynomials of twice the length as those used for calculating the radial gain $g_r$, and stored in registers 762, 766 for use in processing all pixels in the respective line.

Address mapping unit 700 includes a polynomial function generator 750. In the illustrated embodiment, the polynomial function generator 750 calculates all polynomial functions for the perspective-corrected horizontal gain $g_x$, the perspective-corrected vertical index $y_p$, and the radial gain $g_r$. Address mapping unit 700 also includes a parameter multiplexer (PMUX) 756, a variable multiplexer (VMUX) 758, and a coordinate multiplexer (RMUX) 760. The multiplexers 756, 758, 760 are controlled by a control unit 754. Polynomial function generator 750 receives input from the parameter multiplexer 756 and variable multiplexer 758.

Address mapping unit 700 receives an output horizontal perspective center index $x_{cpo}$, an optical horizontal perspective center index $x_{cpi}$, and horizontal and vertical optical center indexes $x_{center}$, $y_{center}$, respectively. As in address mapping units 400 (FIG. 4) and 600 (FIG. 6), in address mapping unit 700, the output horizontal perspective center index $x_{cpo}$ represents the horizontal center of the output image, the optical horizontal perspective center index $x_{cpi}$ represents the location of the horizontal center for the desired perspective of the input image, and the horizontal and vertical optical center indexes $x_{center}$, $y_{center}$, respectively, represent the center pixel address of the input image. Address mapping unit 700 uses the difference of optical horizontal perspective center index $x_{cpi}$ and horizontal optical center indexes $x_{center}$; thus the value of the difference $x_{cpi} - x_{center}$ may be received rather than the individual values. The center indexes $x_{cpo}$, $x_{cpi}$, $x_{center}$, $y_{center}$ may be input from an external program or user, or may be pre-programmed in address mapping unit 700.

Address mapping unit 700 also includes a horizontal gain register 766 for storing the perspective-corrected horizontal gain $g_x$, a vertical optical offset register 762 for storing the vertical optical offset $y_{opt}$, a squared vertical optical offset register 764 for storing the squared value of the vertical optical offset $y_{opt}^2$, and an odd polynomial register 768 for storing odd terms $y_{p\ odd}$, $g_{x\ odd}$ of the perspective-corrected vertical index $y_P$ and the perspective-corrected horizontal gain $g_x$, both of which are output by the polynomial function generator 750. Outputs of the registers 766, 762, 764, 768 are also controlled by the control unit 754, as described below.

Parameter multiplexer 756 receives five inputs, each of which is one of five sets of polynomial coefficients: the odd $P_{y\ odd}$ and even $P_{y\ even}$ terms for the vertical index polynomial coefficients $P_y$; the odd $P_{x\ odd}$ and even $P_{x\ even}$ terms for the horizontal index polynomial coefficients $P_x$; and the radial gain polynomial coefficients $P_r$. The polynomial coefficients $P_{y\ odd}$, $P_{y\ even}$, $P_{x\ odd}$, $P_{x\ even}$, $P_r$ may be input from an external program or a user, or may be pre-programmed in address mapping unit 700. The odd $P_{y\ odd}$, $P_{x\ odd}$ and even $P_{y\ even}$, $P_{x\ even}$ terms for the horizontal and vertical index polynomial coefficients $P_x$, $P_y$ may be received separately by address mapping unit 700, or separated at the input to the parameter multiplexer 756.

Variable multiplexer 758 receives five inputs, the first four of which are the squared value of the vertical output index $(y_o)^2$, as output by a first product circuit 759. The final input to variable multiplexer 758 is a squared radius $r^2$ determined for each output pixel address $(x_o, y_o)$.

Coordinate multiplexer 760 receives two inputs, the first being the vertical optical offset $y_{opt}$ stored in the vertical optical offset register 762. The other input to coordinate multiplexer 760 is the horizontal optical offset $x_{opt}$. Thus, only the final inputs to both variable multiplexer 758 (i.e., squared radius $r^2$) and coordinate multiplexer 760 (i.e., horizontal optical offset $x_{opt}$) change within a given row of output pixel values $(x_{0 \rightarrow M}, y_N)$.

Address mapping unit 700 also includes several switches 751, 753, 755, 757 further described herein. The first switch 751 separates terms of polynomials $y_P$ and $g_x$ from the radial gain polynomial $g_r$ when these polynomials are output by the polynomial function generator 750. The second switch 753 separates even terms $y_{p\ even}$, $g_{x\ even}$ from odd $y_{p\ odd}$, $g_{x\ odd}$ terms of the perspective-corrected vertical index $y_P$ and the perspective-corrected horizontal gain $g_x$. The third switch 755 separates the perspective-corrected vertical index $y_P$ from the perspective-corrected horizontal gain $g_x$. The fourth switch 757 separates the squared value of the vertical optical offset $y_{opt}^2$ from the squared value of the horizontal optical offset $x_{opt}^2$. The switches 751, 753, 755, 757 switch between one of two positions, creating alternate connections depending upon the current cycle of the address mapping unit 700, as further described below. The switches 751, 753, 755, 757 may be controlled by control unit 754, or alternatively may be self-controlled according to alternating input values.

The address mapping unit 700 calculates corresponding input address indexes $x_i$, $y_i$ as described below. In the described embodiment, the input address indexes $x_i$, $y_i$ are calculated as scaled floating point values, such as for use with interpolation filter 326 of image processor 300 (FIG. 3). In another embodiment, however, the input address indexes $x_i$, $y_i$ may be calculated as integer values, such as for use with image processor 200 (FIG. 2).

The operation of address mapping unit 700 is described herein. For each row of output pixel addresses, address mapping unit 700 cycles through five different states. The first two states determine the odd and even terms of the vertical optical offset $y_{opt}$. The second two states are used to determine the odd and even terms of the perspective-corrected horizontal gain $g_x$. In the final state, the horizontal and vertical input indexes $x_i$, $y_i$ corresponding to each output pixel address $(x_o, y_o)$ in the row of output pixel addresses $(x_{0 \rightarrow M}, y_N)$ are determined and output by address mapping unit 700.

Beginning with each new row of output pixel addresses, address mapping unit 700 is set to the first state. The control module 754 is programmed to set parameter multiplexer 756 and variable multiplexer 758 to output their respective first inputs. First switch 751 is set to direct the output of the polynomial function generator 750 to the second switch 753, which in turn is set to output to odd polynomial register 768. Odd polynomial register 768 is set to receive a value for storing.

Address mapping unit 700 receives output pixel indexes $x_o$, $y_o$ of the desired output pixel address $(x_o, y_o)$ from output address generator 320 (FIG. 3). Variable multiplexer 758 outputs the squared vertical output index $y_0^2$ to polynomial function generator 750. Parameter multiplexer 756 outputs the odd terms $P_{y\ odd}$ of the vertical index polynomial coefficients $P_y$ to the polynomial function generator 750. The polynomial function generator 750 produces the odd terms $y_{p\ odd}$ of the perspective-corrected vertical index $y_p$, which pass through first and second switches 751, 753 and are temporarily stored in odd polynomial register 768.

Address mapping unit 700 is next set to the second state. Control module 754 switches the second switch 753 to output to a first summing circuit 763, and the third switch to direct the output of the first summing circuit 763 to a first subtraction circuit 765. The odd polynomial register 768 is set to output the odd terms $y_{p\ odd}$ of the perspective-corrected vertical index $y_p$ to a second product circuit 761, where it is multiplied by the vertical output index $y_o$.

Control module 754 also switches the parameter multiplexer 756 and the variable multiplexer 758 to output their respective second inputs (i.e., $P_{y\ even}$ and $y_0^2$) to the polynomial function generator. The polynomial function generator 750 computes the even terms $y_{p\ even}$ of the perspective-corrected vertical index $y_p$ from the even coefficients $P_{y\ even}$ of the vertical index polynomial coefficients $P_y$ and the squared vertical output index $y_0^2$. The even terms $y_{p\ even}$ of the perspective-corrected vertical index $y_p$ are passed through first and second switches 751, 753 and input to a first summing circuit 763 with the odd terms $y_{p\ odd}$ output by the second product circuit 761, thus producing the perspective-corrected vertical index $y_p$. The perspective-corrected vertical index $y_p$ passes through the third switch 755, the vertical optical center index $y_{center}$ is subtracted at first subtraction circuit 765, and the resulting vertical optical offset $y_{opt}$ is stored in the vertical optical offset register 762.

Address mapping unit 700 is next set to the third state. First switch 751 remains set to direct the output of the polynomial function generator 750 towards second switch 753, while second switch 753 is reset to output to odd polynomial register 768. Odd polynomial register 768 is set to receive a value for storing.

Control module 754 switches the parameter multiplexer 756 and the variable multiplexer 758 to output their respective third inputs to the polynomial function generator 750. Variable multiplexer 758 outputs the squared vertical output index $y_0^2$, while parameter multiplexer 756 outputs the odd terms $P_{x\ odd}$ of the horizontal index polynomial coefficients $P_x$. The polynomial function generator 750 produces the odd, terms $g_{x\,odd}$ of the perspective-corrected horizontal gain $g_x$; the odd terms $g_{x\,odd}$ are temporarily stored in the odd polynomial register 768.

Address mapping unit 700 is next set to the fourth state. Control module 754 sets second switch 753 to output to first summing circuit 763, and sets third switch 755 to direct the output of the first summing circuit 763 to the horizontal gain register 766. The odd polynomial register 768 is set to output the odd terms $g_{x\,odd}$ of the perspective-corrected horizontal gain $g_x$ to second product circuit 761, where they are multiplied by the vertical output index $y_o$.

Control module 754 also switches the parameter multiplexer 756 and the variable multiplexer 758 to output their respective fourth inputs to the polynomial function generator 750. The polynomial function generator 750 computes the even terms $g_{x\,even}$ of the perspective-corrected horizontal gain $g_x$ from the squared vertical output index $y_o^2$ and the even terms $P_{x\,even}$ of the horizontal index polynomial coefficients $P_x$. The even terms $g_{x\,even}$ of the perspective-corrected horizontal gain $g_x$ are passed through first and second switches 751, 753 and input to a first summing circuit 763 with the odd terms $g_{x\,odd}$ output by the second product circuit 761, thus producing the perspective-corrected horizontal gain $g_x$. The perspective-corrected horizontal gain $g_x$ passes through third switch 755 and is stored in the horizontal gain register 766. This value of the perspective-corrected horizontal gain $g_x$ is maintained in the horizontal gain register 766 and used to calculate corresponding input pixel addresses $(x_i, y_i)$ for the rest of the row of desired output addresses $(x_{0\to M}, y_N)$.

During either the third or fourth states of the polynomial function generator 750, control module 754 sets radial gain multiplexer 760 to output its first input, and sets fourth switch 757 to output to the squared vertical optical offset register 764. The vertical optical offset $y_{opt}$ is output by the vertical optical offset register 762, squared by a fourth product circuit 770, passed through the fourth switch 757, and stored in the squared vertical optical offset register 764. This squared vertical optical offset $y_{opt}^2$ is used to calculate corresponding input pixel addresses $(x_i, y_i)$ for the rest of the row of desired output addresses $(x_{0\to M}, y_N)$.

Address mapping unit 700 now enters the final state. With the squared vertical optical offset $y_{opt}^2$ and perspective-corrected horizontal gain $g_x$ calculated through the first four states, corresponding horizontal and vertical input indexes can be determined for each desired output address in the row $(x_{0\to M}, y_N)$, as described below.

Control module 754 sets parameter multiplexer 756, variable multiplexer 758, and radial multiplexer 760 to output their respective final inputs. Parameter multiplexer 756 outputs the radial gain coefficients $P_r$ to the polynomial function generator 750. First switch 751 is set to output to a reciprocal function block 752, and fourth switch 757 is set to output to a third summing circuit 771. Squared vertical optical offset register 764 is set to output the squared vertical optical offset $y_{opt}^2$ to the third summing circuit 771, and horizontal gain register 766 is set to output the horizontal gain $g_x$ to a third product circuit 768.

Each horizontal output index $x_o$ is input into a second subtraction circuit 767, where the output horizontal perspective center index $x_{cpo}$ is subtracted. In a third product circuit 768, the resulting horizontal offset $x_{offset}$ is multiplied by the perspective-corrected horizontal gain $g_x$ that is output by the horizontal gain register 766. This product $x_{offset} \times g_x$ is summed by second summing circuit 769 with the difference of the input horizontal perspective center index $x_{cpi}$ and the horizontal optical center index $x_{center}$, and the result of the summation $(x_{cpi} - x_{center}) + (x_{offset} \times g_x)$ is the horizontal optical offset $x_{opt}$.

Radial multiplexer 760 receives and outputs the horizontal optical offset $x_{opt}$, which is then squared by fourth product circuit 770 to generate a squared horizontal optical offset $x_{opt}^2$. The squared horizontal optical offset $x_{opt}^2$ is directed by fourth switch 757 into the third summing circuit 771 along with the squared vertical optical offset $y_{opt}^2$ output by the squared vertical optical offset register 764. The sum output by third summing circuit 771 is the squared radius $r^2$. Variable multiplexer 758 receives and outputs the squared radius $r^2$ to polynomial function generator 750. Parameter multiplexer 756 outputs the set of radial gain polynomial coefficients $P_r$ to the polynomial function generator 750. Polynomial function generator 750 generates the radial gain $g_r$, which then passes through first switch 751 and reciprocal function block 752.

Both the stored vertical optical offset $y_{opt}$ and the current horizontal optical offset $x_{opt}$ are multiplied by the radial gain $g_r$ at fifth and sixth product circuits 772, 773, respectively. These values are then offset by the horizontal and vertical optical center indexes $y_{center}$, $x_{center}$ at fourth and fifth summing circuits 774, 775, thus centering the dewarped horizontal and vertical offset optical offset indexes $x_{opt} \times g_r$, $y_{opt} \times g_r$ relative to the center pixel address $(x_{center}, y_{center})$ of the input image $f_i(x, y)$. The resulting sums $(x_{opt} \times g_r) + x_{center}$, $(y_{opt} \times g_r) + y_{center}$ represent the respective horizontal and vertical input indexes $x_i$, $y_i$ that will be used to determine the pixel value $f(x_o, y_o)$ at the desired output pixel address $(x_o, y_o)$.

Figure 8:
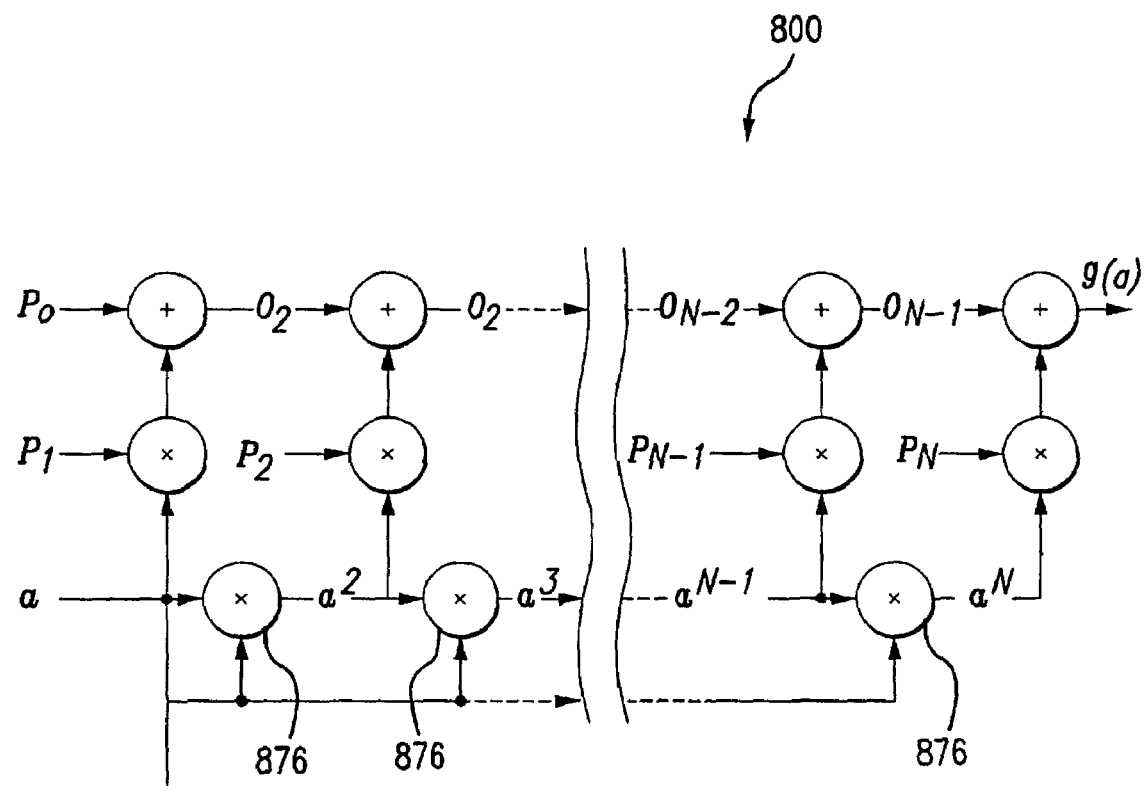
FIG. 8 is a functional diagram of a polynomial function generator.

FIG. 8 is a functional diagram of a polynomial function generator 800, in accordance with polynomial function generators (i.e., polynomial function generators 430, 432, 434 in FIGS. 4 and 6, and polynomial function generator 750 in FIG. 7) used in embodiments described herein. Polynomial function generator 800 generates $N^{th}$ order polynomial equation $g(a)$ from the input variable a and a set of constant coefficients $P = [p_0, p_1, p_2, \ldots, p_{N-1}, p_N]$. The input variable a passes through successive multipliers 876 to produce increasing powers of a (i.e., $a, a^2, a^3 \ldots a^{N-1}, a^N$). These increasing powers of a are multiplied by individual coefficients $P = [p_1, p_2, \ldots, p_{N-1}, p_N]$, and summed together along with the $0^{th}$ order coefficient $p_0$ to produce the $N^{th}$ order polynomial equation shown in Equation 1:

$$g(a) = P_N a^N + P_{N-1} a^{N-1} \ldots + P_2 a^2 + P_1 a + P_0. \quad \text{Equation 1:}$$

The above described embodiments provide spatially efficient methods and apparatuses for implementing dewarping and/or perspection correction when processing an input image. Although certain advantages and embodiments have been described above, those skilled in the art will recognize that substitutions, additions, deletions, modifications and/or other changes may be made. For example, the product, summing, and subtraction circuits in embodiments described herein may be implemented by a single arithmetic circuit or program, multiple circuits or programs, or through other known circuits or devices. The processing described may be implemented on a stand-alone image processor, as part of an imaging device, or as part of a system-on-chip device that contains image acquisitions and processing circuitry. The polynomial function generators in the embodiments described herein may be of any appropriate order for image processing. Accordingly, embodiments of the image processor and address mapping units are not limited to those described above.

Figure 9:
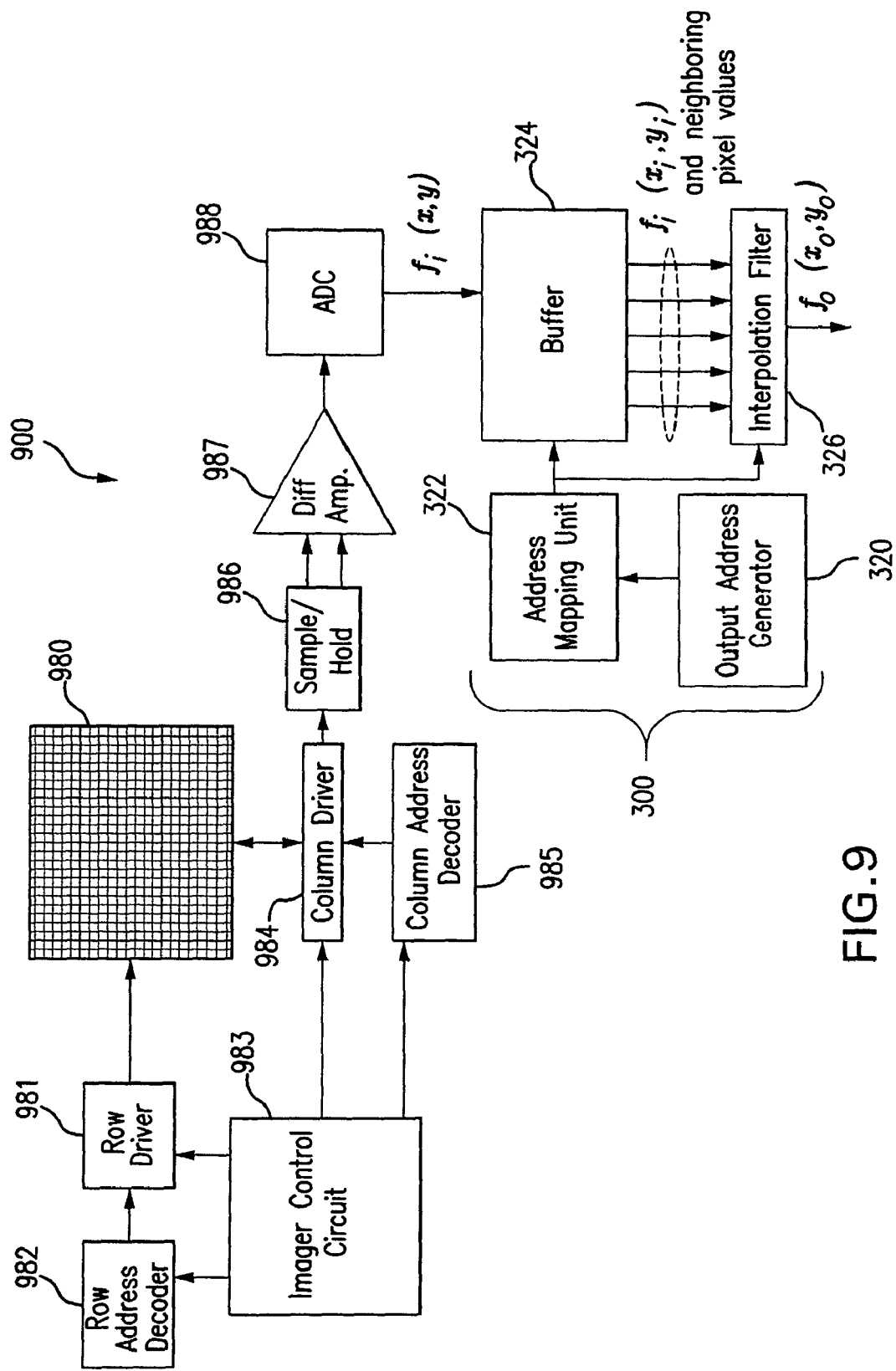
FIG. 9 is an imaging device coupled to an image processor, in accordance with an embodiment described herein.

The image processing described in embodiments herein may be implemented using either hardware or software or via a combination of hardware and software. For example, in an integrated system-on-chip semiconductor CMOS imaging device 900, as illustrated in FIG. 9, the dewarping and/or perspective correction may be implemented within a hardware implemented image processor 300. FIG. 9 illustrates a simplified block diagram of a system-on-chip semiconductor CMOS imaging device 900 having a pixel array 980 including a plurality of pixel cells arranged in a predetermined number of columns and rows. Each pixel cell is configured to receive incident photons and to convert the incident photons into electrical signals. Pixel cells of pixel array 980 are output row-by-row as activated by a row driver 981 in response to a row address decoder 982. Column driver 984 and column address decoder 985 are also used to selectively activate individual pixel columns. An imager control circuit 983 controls address decoders 982, 985 for selecting the appropriate row and column lines for pixel readout. The control circuit 983 also controls the row and column driver circuitry 981, 984 such that driving voltages may be applied.

To capture an image, the imager control circuit 983 triggers the pixel array 980, via the row and column decoders 982, 985 and row and column drivers 981, 984 to capture frames of an image. For each frame captured, each pixel cell generally outputs both a pixel reset signal $v_{rst}$ and a pixel image signal $v_{sig}$, which are read by a sample and hold circuit 986 according to a sampling scheme, for example, a correlated double sampling ("CDS") scheme. The pixel reset signal $v_{rst}$ represents a reset state of a pixel cell. The pixel image signal $v_{sig}$ represents the amount of charge generated by the photosensor in the pixel cell in response to applied light during an integration period. The pixel reset and image signals $v_{rst}$, $v_{sig}$ are sampled, held and amplified by the sample and hold circuit 986.

The sample and hold circuit 986 outputs amplified pixel reset and image signals $V_{rst}$, $V_{sig}$. The difference between $V_{sig}$ and $V_{rst}$ represents the actual pixel cell output with common-mode noise eliminated. The differential signal (e.g., $V_{rst}$–$V_{sig}$) is produced by differential amplifier 987 for each readout pixel cell. The differential signals are digitized by an analog-to-digital (A/D) converter 988.

The analog-to-digital converter 988 supplies the digitized pixel signals $f_i(x,y)$ to image processor 300, which receives and stores the pixel signals from the ADC 988 and performs dewarping and perspective correction, as described above. In the illustrated embodiment, image processor 300 includes output address generator 320, address mapping unit 322, buffer 324, and interpolation filter 326. Image processor 300 outputs pixel signals $f(x_o, y_o)$ for storage in a memory, such as the random access memory 1094 (FIG. 10).

Embodiments of the methods and apparatuses described herein may be used in any system which employs a moving image or video imaging device, including, but not limited to a computer system, camera system, scanner, machine vision, vehicle navigation, video phone, surveillance system, auto focus system, star tracker system, motion detection system, image stabilization system, and other imaging systems. Example digital camera systems in which the invention may be used include video digital cameras, still cameras with video options, cell-phone cameras, handheld personal digital assistant (PDA) cameras, and other types of cameras.

FIG. 10 shows a typical system 1000 in which an imaging device 900 implementing an embodiment of the image processor 300 described herein may be employed; in this example, a digital camera. The system 1000 includes an imaging device 900 that includes either software or hardware to implement the image processing in accordance with the embodiments described above. System 1000 also may include a processing unit 1093, such as a microprocessor, that controls system functions and which communicates with an input/output (I/O) device 1096 over a bus 1092. Imaging device 1000 also communicates with the processing unit 1093 over the bus 1092. System 1000 also includes random access memory (RAM) 1094, and can include removable storage memory 1095, such as flash memory, which also communicates with the processing unit 1093 over the bus 1092. Lens 1090 focuses an image on a pixel array of the imaging device 900 when shutter release button 1091 is pressed.

It should be noted that although the embodiments have been described with specific reference to CMOS imaging devices, they have broader applicability and may be used in any imaging apparatus which generates pixel output values, including charge-coupled devices CCDs and other imaging devices.

What is claimed as new and desired to be protected by Letters Patent of the United States is:

1. An image processor that creates an output image from an input image, the image processor comprising:
   a storage circuit that stores a plurality of lines of pixel values from the input image, each pixel value having an associated input pixel address, and outputs pixel values as an output image;
   an output address generator that specifies an output address for a pixel value in the output image; and
   an address mapping unit that receives the output address and determines at least one input pixel value from the input image stored in the storage circuit which the storage circuit should associate with the output address, wherein the address mapping unit provides dewarping of the input image by applying vertical scaling to a vertical output index of the output address and horizontal scaling to a horizontal output index of the output address to determine dewarped horizontal and vertical indexes corresponding to an input pixel address, wherein the address mapping unit further comprises:
   a first polynomial function generator that determines a radial gain for the horizontal and vertical scaling of dewarping by using a squared horizontal offset value and a squared vertical offset value.

2. The image processor of claim 1, wherein the storage circuit further comprises:
   a buffer circuit that receives the plurality of lines of pixel values from the input image and outputs at least one of the pixel values in accordance with the address mapping unit.

3. The image processor of claim 2, wherein the storage circuit further comprises:
   an interpolation filter that receives the at least one of the pixel values that is output from the buffer and uses interpolation to produce a corresponding output pixel value.

4. The image processor of claim 1, wherein the address mapping unit provides perspective correction of the input image by applying vertical shifting to a vertical output index of the output address and horizontal scaling to a horizontal output index of the output address, and outputs perspective-corrected horizontal and vertical indexes corresponding to an input pixel address.

5. The image processor of claim 4, wherein the address mapping unit further comprises:
   a second polynomial function generator that provides the vertical shifting for the perspective correction; and
   third polynomial function generator that provides a horizontal gain for the horizontal scaling for the perspective correction.

6. The image processor of claim 1, wherein the address mapping unit is further configured to perform:
perspective correction of the input image by applying vertical shifting to a vertical output index of the output address and horizontal scaling to a horizontal output index of the output address to determine perspective-corrected horizontal and vertical indexes and
wherein the dewarping is perfomed on the perspective-corrected vertical index and the perspective-corrected horizontal index.

7. The image processor of claim 1, wherein the image processor is part of a system for capturing and processing the input image, the system further comprising:
an imaging device having a pixel array; and
an imager control circuit for controlling capture of the input image.

8. The image processor of claim 7, wherein the system is contained on a single chip.

9. An image processor that creates an output image from an input image, the image processor comprising:
a storage circuit that stores a plurality of lines of pixel values from the input image, each pixel value having an associated input pixel address, and outputs pixel values as an output image;
an output address generator that specifies an output address for a pixel value in the output image; and
an address mapping unit that receives the output address and determines at least one input pixel value from the input image stored in the storage circuit which the storage circuit should associate with the output address, wherein the address mapping unit provides dewarping of the input image, wherein the address mapping unit is configured to provide:
perspective correction of the input image by applying vertical shifting to a vertical output index of the output address and horizontal scaling to a horizontal output index of the output address to determine perspective-corrected horizontal and vertical indexes; and
dewarping of the input image by applying vertical scaling to the perspective corrected vertical output index and horizontal scaling to the perspective-corrected horizontal index to determine horizontal and vertical input indexes corresponding to an input pixel address, the address mapping unit further comprising:
a first polynomial function generator that provides a value for the vertical shifting for the perspective correction;
a second polynomial function generator that provides a horizontal gain for the horizontal scaling for the perspective correction; and
a third polynomial function generator that determines a radial gain for the horizontal scaling and the vertical scaling of the dewarping by using a squared horizontal offset value and a squared vertical offset value.

10. The image processor of claim 9, wherein the address mapping unit receives:
the vertical output index and horizontal output index of the output address provided by the output address generator;
a first set of coefficients used by the first polynomial function generator for determining a vertical offset for the vertical shifting for perspective correction;
a second set of coefficients used by the second polynomial function generator for determining a horizontal gain for the horizontal scaling for perspective correction;
an output horizontal perspective center index representing the horizontal center of the output image;
an optical horizontal perspective center index representing the location of the horizontal center for the desired perspective of the input image;
a third set of coefficients used by the third polynomial function generator to determine the radial gain for the horizontal and vertical scaling of dewarping; and
horizontal and vertical optical center indexes representing the center pixel address of the input image.

11. The image processor of claim 10, wherein the first, second, and third sets of input coefficients are received from an external source.

12. The image processor of claim 10, wherein the first, second, and third sets of input coefficients are stored in the address mapping unit.

13. The image processor of claim 9, wherein the address mapping unit further comprises a reciprocal element that receives an output of the third polynomial function generator and outputs a reciprocal of the output of the third polynomial function generator.

14. An image processor that creates an output image from an input image, the image processor comprising:
a storage circuit that stores a plurality of lines of pixel values from the input image, each pixel value having an associated input pixel address, and outputs pixel values as an output image;
an output address generator that specifies an output address for a pixel value in the output image; and
an address mapping unit that receives the output address and determines at least one input pixel value from the input image stored in the storage circuit which the storage circuit should associate with the output address, wherein the address mapping unit provides dewarping of the input image, wherein the address mapping unit is configured to provide:
perspective correction of the input image by applying vertical shifting to a vertical output index of the output address and horizontal scaling to a horizontal output index of the output address to determine perspective-corrected horizontal and vertical indexes; and
dewarping of the input image by applying vertical scaling to the perspective corrected vertical output index and horizontal scaling to the perspective-corrected horizontal index to determine horizontal and vertical input indexes corresponding to an input pixel address, wherein the address mapping unit further comprises:
a first multiplexer that receives and outputs one of squared horizontal and vertical optical offset values computed from pre-programmed perspective-correction coefficients and horizontal and vertical output indexes from an output address generator;
a second multiplexer that receives and outputs one of a squared value of the vertical output index from the output address generator and a sum of the squared horizontal and vertical optical offset values output by the first multiplexer;
a third multiplexer that receives and outputs one of:
a first set of even and a first set of odd coefficients used for determining a value for the vertical shifting for the perspective correction;
a second set of even and a second set of odd coefficients used for determining a horizontal gain for the horizontal scaling for the perspective correction; and
a fifth set of coefficients used for determining the radial gain for the horizontal scaling and the vertical scaling of the dewarping by using a squared horizontal offset value and a squared vertical offset value;

a polynomial function generator receiving input from the second and third multiplexers; and a control unit that controls the first, second, and third multiplexers.

15. The image processor of claim 14, further comprising a reciprocal element that receives the radial gain and outputs a reciprocal of the radial gain.

16. A method of processing an input image comprising:

storing a plurality of pixel values of the input image in a buffer, each pixel of the input image having a corresponding input pixel address;

designating an output pixel address having a horizontal output index and a vertical output index;

determining an input pixel address corresponding to the designated output pixel address by calculating a horizontal input index and a vertical input index, wherein calculating the horizontal and vertical input indexes provides dewarping of the input image;

determining an output pixel value associated with the output pixel address based on the pixel value at the corresponding at least one input pixel address; and outputting the output pixel value, wherein calculating the horizontal and vertical input indexes provides for:

perspective correction of the input image by applying vertical shifting to the vertical output index and horizontal scaling to the horizontal output index to determine perspective-corrected horizontal and vertical indexes; and dewarping of the input image by applying vertical scaling to the perspective-corrected vertical index and horizontal scaling to the perspective-corrected horizontal index to determine horizontal and vertical input indexes corresponding to an input pixel address which the storage circuit should associate with the output address, wherein calculating the horizontal and vertical input indexes comprises:

generating a perspective-corrected vertical index from the vertical output index and a first set of coefficients for determining the amount of vertical shifting;

generating perspective-corrected gain from the vertical output index and a second set of coefficients for determining the amount of horizontal scaling for dewarping;

subtracting an output horizontal perspective center index from the horizontal output index to produce a horizontal offset, wherein the output horizontal perspective center index represents the horizontal center of the output image;

multiplying the perspective-corrected gain and the horizontal offset, and adding a desired new horizontal perspective center to the product to generate a perspective-corrected horizontal index;

subtracting a vertical optical center index from the vertical output index to produce a vertical optical offset value, and subtracting a horizontal optical center index from the horizontal output index to produce a horizontal optical offset value, wherein the vertical and horizontal optical center indexes represent the center pixel address of the input image;

calculating the radial gain by:

squaring the horizontal optical offset value;

squaring the vertical optical offset value;

generating a radial gain from a sum of the squared horizontal and vertical optical offset values and a third set of coefficients for determining the horizontal scaling and the vertical scaling for the dewarping; and outputting the radial gain;

multiplying the vertical optical offset and the radial gain, and adding the vertical optical center index to the product to generate the dewarped vertical index; and multiplying the horizontal optical offset and the radial gain, and adding the horizontal optical center index to the product to generate the dewarped horizontal index.

17. The method of claim 16, wherein the horizontal and vertical input indexes are calculated as integer values.

18. The method of claim 16, wherein the horizontal and vertical input indexes are calculated as scaled floating point values, each having an integer component and a fractional component.

19. The method of claim 16, wherein the horizontal and vertical input indexes are equal to the perspective-corrected horizontal and vertical indexes, respectively.

20. The method of claim 16, wherein the horizontal and vertical input indexes are equal to the dewarped horizontal and vertical indexes, respectively.

21. The method of claim 16, wherein calculating the radial gain further comprises calculating a reciprocal value of the generated radial gain, and outputting the reciprocal value as the radial gain.

22. The method of claim 16, wherein the steps of storing a plurality of pixel values, designating an output pixel address, determining an input pixel address, determining an output pixel value, and outputting the output pixel value are implemented on a single microchip.

23. The method of claim 16, wherein the steps of storing a plurality of pixel values, designating an output pixel address, determining an input pixel address, determining an output pixel value, and outputting the output pixel value are implemented by a single processing module in a computer processor.

24. A method of processing an input image, the method comprising:

storing a plurality of rows of pixel values of the input image, each pixel of the input image having an input pixel address, each input pixel address having a horizontal index and a vertical index; and generating a row of output pixel values, each output pixel value having an output pixel address having a horizontal output index and a vertical output index, wherein each of the output pixel values is determined by:

designating the output pixel address corresponding to the output pixel value;

determining an input pixel address corresponding to the designated output pixel address, wherein the determination includes calculating a horizontal input index and a vertical input index, wherein the determination provides for at least one of perspective correction and dewarping;

determining the output pixel value associated with the output pixel address based on the stored pixel value corresponding to the determined input pixel address; and outputting the output pixel value, wherein generating a row of output pixel values further comprises:

generating a vertical offset perspective-corrected index and storing it in a first register; and generating a perspective-corrected horizontal-gain and storing it in a second register, and wherein determining an input pixel address corresponding to the designated output pixel address for each output pixel address in the row of output pixel values further comprises:

inputting the horizontal output index and an output horizontal perspective center in a first subtraction means;

inputting the result of the first subtraction means and the perspective-corrected horizontal gain stored in the second register into a second product means to generate a perspective-corrected horizontal index;
entering the perspective-corrected horizontal index and a difference of an optical horizontal perspective center and an optical center horizontal index into a second summing means to generate a horizontal offset perspective-corrected index;
generating a radial gain based on a square of the horizontal offset perspective-corrected index and a square of the vertical offset perspective-corrected index;
inputting the vertical offset perspective-corrected index and the radial gain into a third product means;
inputting the horizontal offset perspective-corrected index and the radial gain into a fourth product means;
inputting a result of the third product means and the optical center vertical index to a summing means to generate the input vertical index; and
inputting a result of the fourth product means and the optical center horizontal index to a summing means to generate the input horizontal index.

25. The method of claim 24, wherein generating a radial gain further comprises calculating a reciprocal value of the generated radial gain, and inputting the reciprocal value as the radial gain into the third product means.

26. The method of claim 24, wherein the steps of storing a plurality of rows of pixel values of the input image and generating a row of output pixel values are performed on a single microchip.

27. The method of claim 24 wherein the steps of storing a plurality of rows of pixel values of the input image and generating a row of output pixel values are performed by a single processing module on a computer processor.

* * * * *